US011150493B2

(12) United States Patent
Shelef (10) Patent No.: US 11,150,493 B2
(45) Date of Patent: Oct. 19, 2021

(54) OXYGEN PERMEABLE SCLERAL CONTACT LENSES WITH THICK PAYLOADS

(71) Applicant: Spy Eye, LLC, Palo Alto, CA (US)

(72) Inventor: Ben H. Shelef, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 109 days.

(21) Appl. No.: 16/360,872

(22) Filed: Mar. 21, 2019

(65) Prior Publication Data
US 2020/0301170 A1    Sep. 24, 2020

(51) Int. Cl.
*G02C 7/04* (2006.01)
*B29D 11/00* (2006.01)

(52) U.S. Cl.
CPC ........ *G02C 7/049* (2013.01); *B29D 11/00076* (2013.01); *B29D 11/00817* (2013.01); *G02C 7/047* (2013.01); *G02C 2202/16* (2013.01)

(58) Field of Classification Search
CPC .............. G02B 27/01; G02B 27/0172; G02B 2027/013; G02B 2027/0132; G02B 2027/0147; G02C 7/00; G02C 7/04; G02C 7/02; G02C 7/049; G02C 7/047; G02C 7/041; G02C 7/044; G02C 11/00; G02C 11/10; G02C 2202/16; B29D 11/00076; B29D 11/00817
USPC ............ 351/159.04, 159.01, 159.02, 159.03, 351/159.73, 159.74, 178, 160 R
See application file for complete search history.

(56) References Cited

U.S. PATENT DOCUMENTS

| | | | |
|---|---|---|---|
| 3,973,838 | A | 8/1976 | Page |
| 4,486,577 | A | 12/1984 | Mueller |
| 4,594,401 | A | 6/1986 | Takahashi |
| 4,954,587 | A | 9/1990 | Mueller |
| 5,548,352 | A | 8/1996 | Dewey |
| 6,106,553 | A | 8/2000 | Feingold |
| 8,153,726 | B2 | 4/2012 | Hoffman |
| 8,786,675 | B2 | 7/2014 | Deering |
| 8,911,078 | B2 | 12/2014 | Meyers |
| 9,039,171 | B2 | 5/2015 | Alexander |
| 9,063,352 | B2 | 6/2015 | Ford |
| 9,310,627 | B2 | 4/2016 | Havenstrite |
| 9,341,864 | B2 | 5/2016 | De Juan, Jr. |

(Continued)

OTHER PUBLICATIONS

Arianpour et al., "Wearable telescopic contact lens"; Applied Optics, vol. 54, No. 24; Aug. 20, 2015; p. 7195-7204.*

(Continued)

*Primary Examiner* — Jie Lei
(74) *Attorney, Agent, or Firm* — Fenwick & West LLP (57) ABSTRACT

A contact lens has a core that is thick enough to accommodate a payload. The core has a base surface for mounting the contact lens to the sclera of the user's eye. It also provides mechanical integrity to carry the payload. The contact lens also includes an outer covering and an inner covering. Each covering is a thin layer of gas-permeable material shaped to form an air gap between the covering and the core. The two air gaps are connected by an air path that traverses the core. Oxygen from an outside environment passes through the gas-permeable outer covering to reach the outer air gap, through the air path to the inner air gap, and through the gas-permeable inner covering to reach the cornea of the wearer's eye.

21 Claims, 8 Drawing Sheets

(56) References Cited

U.S. PATENT DOCUMENTS

| | | |
|---|---|---|
| 9,389,434 B2 | 7/2016 | Jubin |
| 9,395,468 B2 | 7/2016 | Havenstrite |
| 9,442,307 B2 | 9/2016 | Meyers |
| 9,740,026 B2 | 8/2017 | De Juan, Jr. |
| 2006/0290882 A1 | 12/2006 | Meyers |
| 2010/0001926 A1 | 1/2010 | Amirparviz |
| 2010/0118262 A1 | 5/2010 | Rosenthal |
| 2012/0232649 A1 | 9/2012 | Cuevas |
| 2013/0308092 A1 | 11/2013 | Groisman |
| 2014/0192315 A1 | 7/2014 | Liu |
| 2015/0234204 A1 | 8/2015 | Havenstrite |
| 2015/0312560 A1 | 10/2015 | Deering |
| 2016/0054589 A1 | 2/2016 | Otts |
| 2016/0216534 A1 | 7/2016 | Legerton |
| 2016/0266406 A1 | 9/2016 | Meyers |
| 2016/0349535 A1* | 12/2016 | Creighton ............. G02C 7/027 |
| 2016/0379054 A1 | 12/2016 | Sicari |
| 2017/0242269 A1 | 8/2017 | Havenstrite |
| 2017/0299692 A1 | 10/2017 | Krasner |
| 2017/0299892 A1 | 10/2017 | Pugh |
| 2017/0360994 A1 | 12/2017 | Havenstrite |
| 2018/0088350 A1 | 3/2018 | Otts |
| 2018/0224671 A1 | 8/2018 | Lemoff |

OTHER PUBLICATIONS

Harvitt, D.M. et al., "Re-Evaluation of the Oxygen Diffusion Model for Predicting Minimum Contact Lens Dk/t Values Needed to Avoid Corneal Anoxia," Optometry and Vision Science, 1999, pp. 712-719, vol. 76, No. 10.

Holden, B.A. et al., "Critical Oxygen Levels to Avoid Corneal Edema for Daily and Extended Wear Contact Lenses," Investigative Ophthalmology & Visual Science, Oct. 1984, pp. 1161-1167, vol. 25, No. 10.

PCT International Search Report and Written Opinion, PCT Application No. PCT/US2018/016419, dated Apr. 4, 2018, 11 pages.

PCT International Search Report and Written Opinion, PCT Application No. PCT/US2019/060071, dated Jan. 22, 2020, 17 pages.

* cited by examiner

OXYGEN PERMEABLE SCLERAL CONTACT LENSES WITH THICK PAYLOADS

BACKGROUND

1. Technical Field

This disclosure relates generally to contact lenses and in particular to oxygen permeable thick contact lenses, for example scleral contact lenses that carry electronic payloads.

2. Description of Related Art

Contact lenses that provide refractive vision correction are commonplace. Most contact lenses in use today are so-called soft contact lenses. They are relatively thin and made of oxygen permeable hydrogels. Oxygen passes through the contact lens material to the cornea. Sufficient oxygen supply is an important requirement for any contact lens because, due to the lack of blood vessels within the human cornea, the tissue that makes up the cornea receives oxygen through exposure to the air. Without a sufficient flow of oxygen through the contact lens, the cornea would suffer.

Recently, there has been increased interest in contact lenses that perform functions other than vision correction. In many of these applications, a contact lens may carry a payload for performing various functions. For example, a contact lens may contain a payload of one or more electrical components, such as projectors, imaging devices (cameras), sensors, batteries, MEMS (micro-electro-mechanical systems), accelerometers and magnetometers, etc. The contact lens must have a sufficient thickness and structural integrity to accommodate the payload. However, increasing the thickness of a contact lens reduces the amount of oxygen that is transmitted through the material of the contact lens to reach the cornea. Often, the payload itself also is not gas permeable, which further reduces the oxygen flow.

As a result, it can be challenging to provide an oxygenation path from the external environment to the cornea, while still meeting the other requirements of the contact lens.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 2:
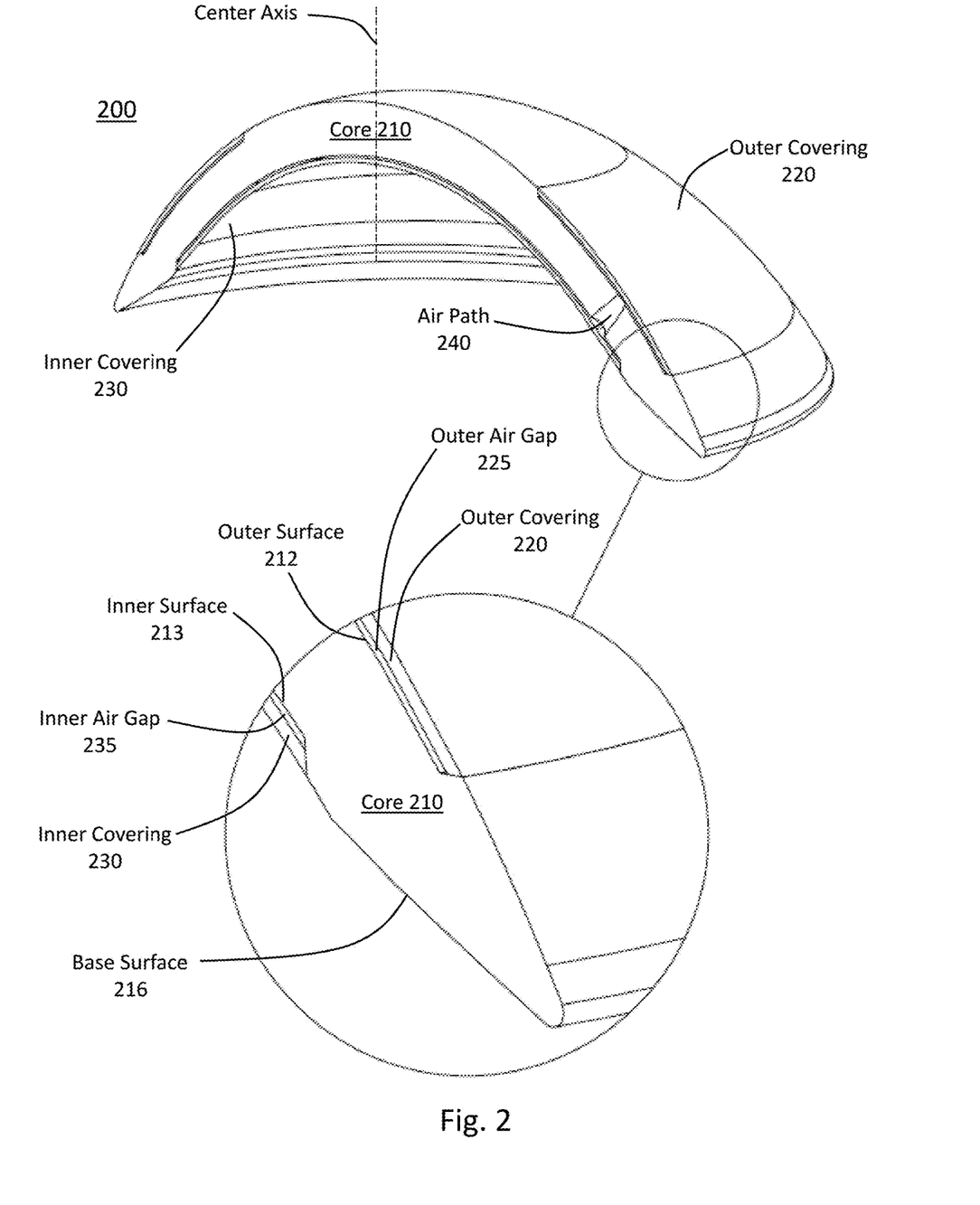
FIG. 2 is a simplified perspective view of a scleral contact lens able to accommodate a thick payload.
Figure 3A:
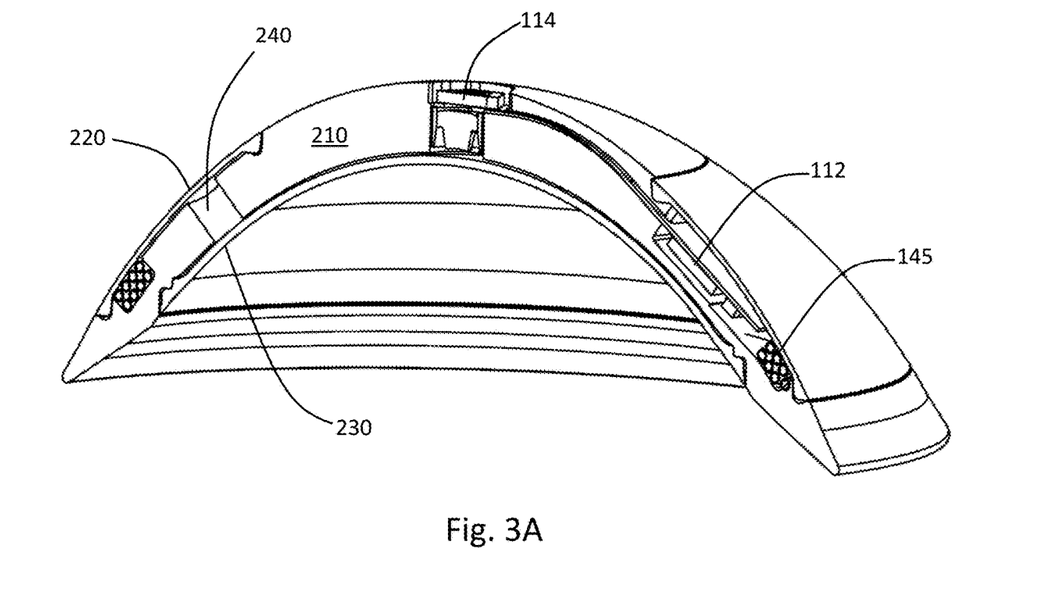
FIG. 3A is a more detailed perspective view of a scleral contact lens able to accommodate a thick payload.
Figure 3B:
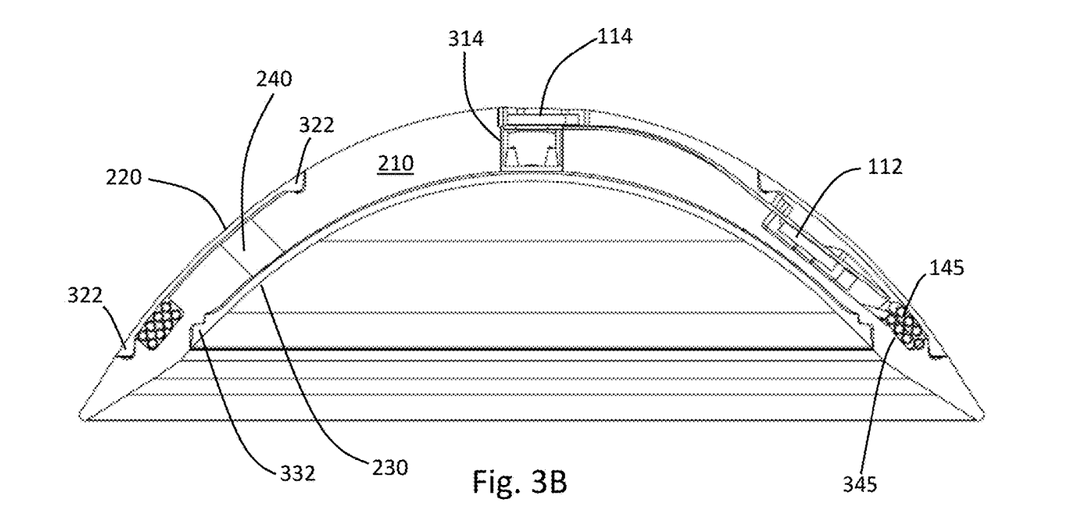
FIG. 3B shows a cross-sectional view of the scleral contact lens of FIG. 3A.
Figure 3C:
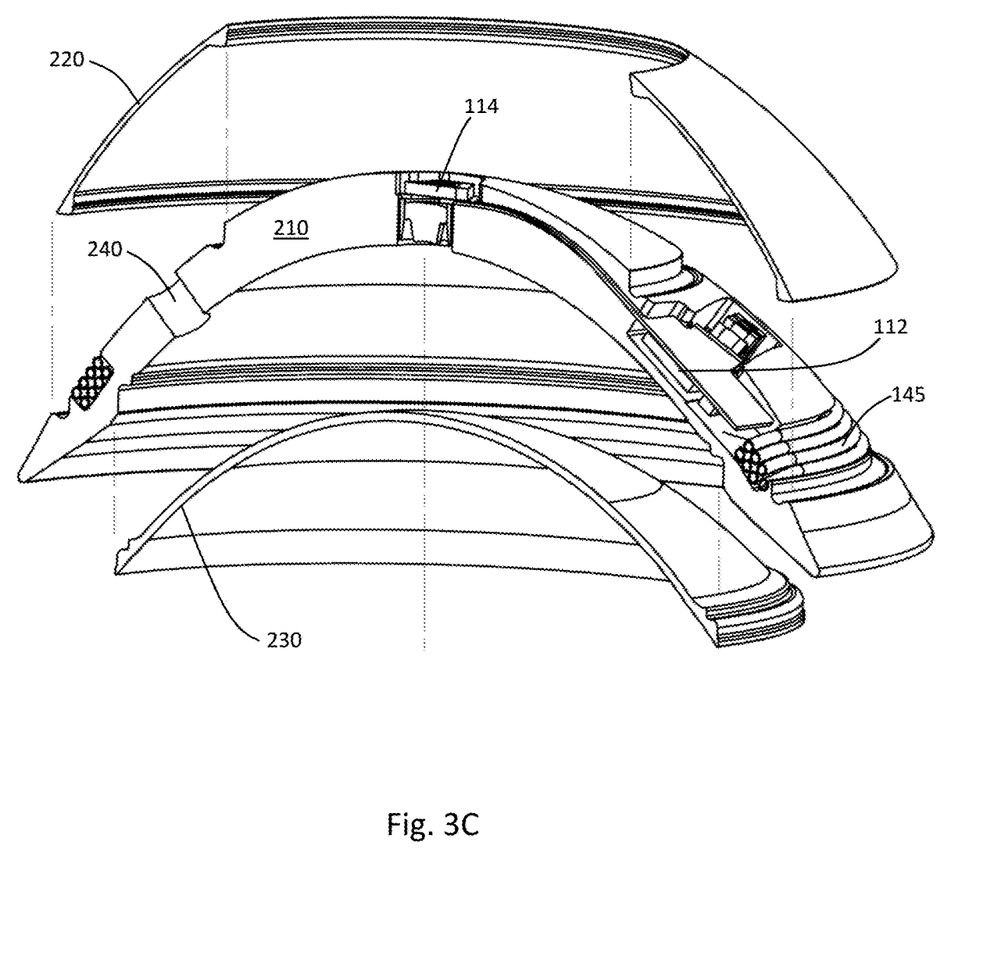
FIG. 3C shows an exploded view of components of the scleral contact lens of FIG. 3A.

In order to ensure sufficient corneal oxygenation while maintaining sufficient structural integrity, a scleral contact lens may be constructed in three layers, for example as shown in greater detail in FIGS. 2-3. The middle structure may contain a payload(s) and is referred to as the core. The core has a base surface for mounting the contact lens to the sclera of the user's eye. It also provides mechanical integrity to carry the payload.

The outward-facing (i.e., facing away from the eye) surface of the core is covered by an outer covering in areas that are exposed to ambient oxygen. An inner covering covers an inward-facing surface of the core above the user's cornea. When worn by a wearer, the outer covering faces the outside environment, while the inner covering is proximate to the wearer's cornea. The outer covering and inner covering are each a thin layer of gas-permeable material, and each is shaped to form an air gap between the covering and the core. The two air gaps are connected by an air path (e.g., air shafts) that traverse the core. Oxygen from the outside environment passes through the gas-permeable outer covering to reach the outer air gap formed between the outer covering and the core, through the air path to the inner air gap formed between the core and the inner covering, and through the gas-permeable inner covering to reach the cornea of the wearer's eye.

Figure 1A:
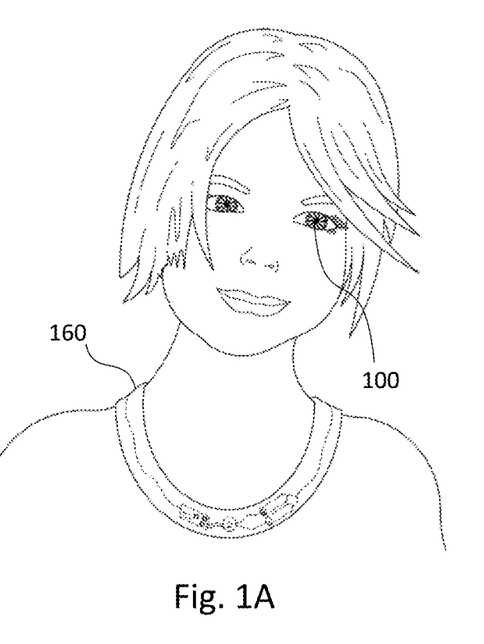
FIG. 1A shows a user wearing a display mounted in a scleral contact lens.
Figure 1B:
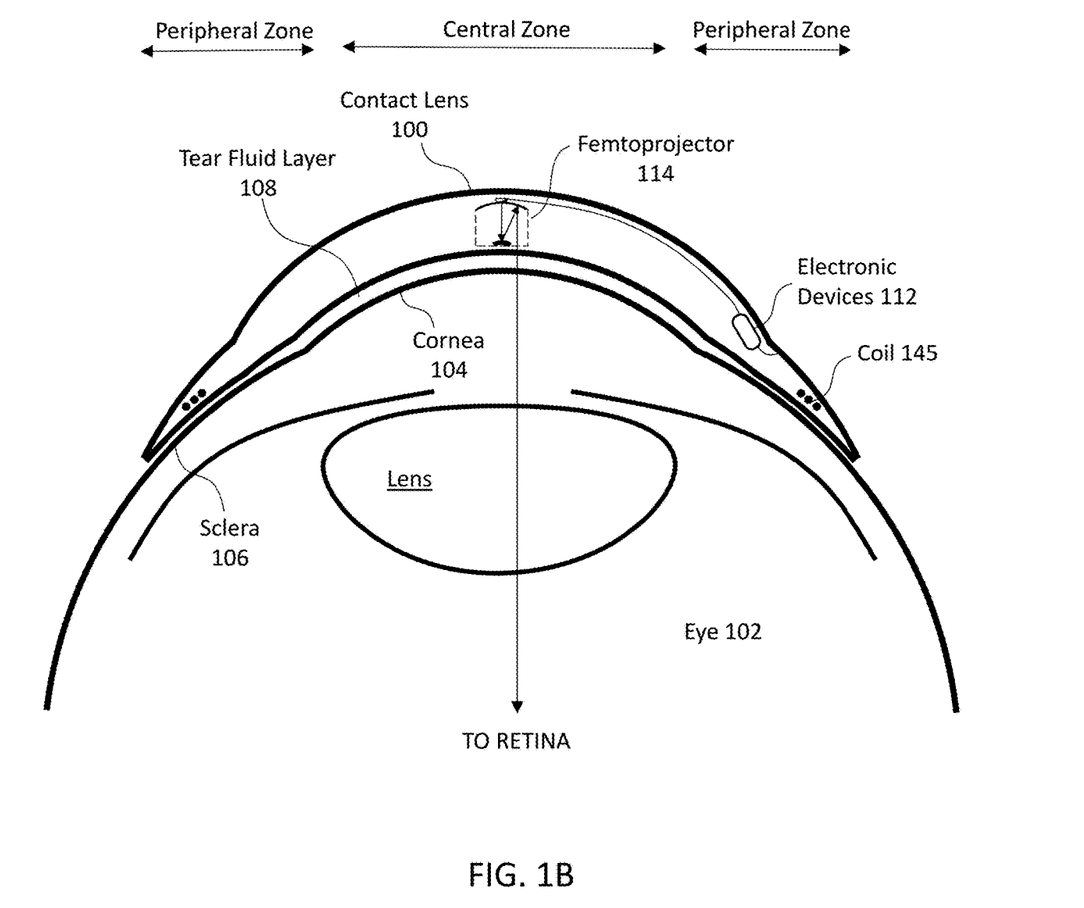
FIG. 1B shows a cross sectional view of the scleral contact lens display mounted on the user's eye.

In more detail, FIG. 1A shows a user wearing a display mounted in a scleral contact lens 100. FIG. 1A also shows an accessory necklace 160, which will be discussed with FIG. 6. FIG. 1B shows a cross sectional view of the scleral contact lens 100 mounted on the user's eye. Scleral contact lenses are designed to not move around on the wearer's eye. The eye 102 includes a cornea 104 and a sclera 106. The scleral contact lens 100 is supported by the sclera 106 and vaults over the cornea 104, typically forming a tear fluid layer 108 between the contact lens 100 and the cornea. The tear fluid layer may have a thickness of about 10 um (microns) to about 200 um over the cornea. Oxygen permeates through the contact lens 100 and tear fluid layer 108 to the cornea 104, at a rate depending upon the geometry of the contact lens 100 and the oxygen transmissibility and thicknesses of the materials that form the contact lens 100.

The contact lens 100 contains payload(s). These payloads may not be gas-permeable and also may require the contact lens to be thicker in order to accommodate and support the payloads. As a result, the approach used in soft contact lenses for corneal oxygenation typically will not be adequate for contact lens 100.

For example, the payload(s) may include electronics, including electronics that require a power source such as a battery or a coil that is inductively powered. In the example of FIG. 1, the payloads include a small projector that projects images onto the wearer's retina (referred to as a femtoprojector 114), and the corresponding electronics 112 to operate the femtoprojector. Both of these are powered by a coil 145 around the periphery of the contact lens. The femtoprojector 114 may include an LED frontplane with an LED array, an ASIC backplane with electronics that receives the data to drive the LED frontplane, and optics to project light from the LED array onto the retina. The femtoprojector 114 preferably fits into a 2 mm by 2 mm by 2 mm volume or even into a 1 mm by 1 mm by 1 mm volume. The contact lens 100 must be sufficiently thick and structurally sound to support the femtoprojector 114 and electronics 112, while still maintaining adequate oxygen flow to the cornea.

The femtoprojector 114 is positioned over the cornea since it projects images onto the retina. The electronics 112 may be positioned away from the cornea, as shown in FIG. 1B. For convenience, the contact lens 100 is divided into a central zone and a peripheral zone. The central zone overlaps the cornea 104 and the area outside the cornea is referred to as the peripheral zone. In FIG. 1, the femtoprojector 114 is located within the central zone of the contact lens, while the electronics 112 and coil 145 are located in the peripheral zone. Because people have eyes of different sizes and shapes, for convenience, the central zone may be defined by a number. For example, the central zone may be defined as the 10 mm diameter center area of the contact lens (i.e., within 5 mm radius of the center axis of the contact lens). The diameter of the boundary between the cornea and the sclera is typically 10-12.5 mm. Payload components that project light onto the retina typically will be located within the central zone due to the required optical path. Conversely, payload components that do not project light onto the retina or otherwise interact with the retina may be located on the edge of the central zone or outside the central zone so that they do not block light from reaching the retina.

Other examples of powered payloads include sensors, cameras, and eye tracking components such as accelerometers, gyroscopes and magnetometers. Payloads may also include passive devices, such as a coil or antenna for wireless power or data transmission, capacitors for energy storage, and passive optical structures (e.g., absorbing light baffles, beam-splitters, imaging optics). The contact lens 100 may also contains multiple femtoprojectors, each of which projects images onto the user's retina. The contact lens 100 moves with the user's eye 102 as the user's eye rotates in its socket. Because the femtoprojectors are mounted in the contact lens 100, they also move with the user's eye and project to the same region of the retina. Some femtoprojector(s) may always project images to the fovea, and other femtoprojector(s) may always project images to more peripheral regions which have lower resolutions. As a result, different femtoprojectors may have different resolutions. The images from different femtoprojectors may be overlapping, to form a composite image on the wearer's retina.

FIG. 2 is a simplified perspective view of a scleral contact lens 200 able to accommodate a thick payload (e.g., greater than 500 um thick). With respect to the contact lens, terms such as "outer" "over" "top" and "up" refer to the direction away from the wearer's eye, while "inner" "under" "bottom" and "down" refer to the direction towards the wearer's eye. The scleral contact lens 200 includes a core 210 that carries the payload(s). The core 210 has a base surface 216 that mounts to the sclera of the eye, an outer surface 212 that faces outwards towards the external environment, and an inner surface 213 that faces inwards towards the cornea of the eye. The contact lens 200 also includes an outer covering 220 that covers the outer surface 212 of the core, and an inner covering 230 that covers the inner surface 213 of the core. Each covering 220, 230 forms a corresponding air gap 225, 235 between the covering and the core 210. An air path 240 through the core 210 connects the two air gaps 225, 235.

Together, the outer covering 220, core 210, and inner covering 230 form a three layer contact lens 200. The outer covering 220, core 210, and inner covering 230 are shaped such that when the contact lens is assembled, an outer air gap 225 is formed between the outer covering 220 and the core 210, and an inner air gap 235 is formed between the core 210 and the inner covering 230. Because the outer and inner air gaps 225 and 235 are each entirely enclosed by their respective structures, the air gaps are not directly exposed to the external environment, preventing any debris or other contaminants from the outside air or from the tear layer from potentially reaching either air gap.

The outer covering 220 is exposed to air or separated from air by a thin tear layer that forms over the covering. As such, oxygen diffuses from the surrounding air through the gas permeable material of the outer covering 220 (and thin tear layer) to reach the outer air gap 225. The oxygen in the outer air gap 225 diffuses through an air path 240 to traverse through the thickness of the core 210 to reach the inner air gap 235. From the inner air gap 235, oxygen diffuses through the gas permeable material of the inner covering 230 to reach the tear fluid layer and underlying cornea of the wearer. Because the inner air gap 235 may cover all or most of the wearer's cornea, oxygen may be distributed evenly across the wearer's cornea through the inner covering 230.

Oxygen diffusion through the air (such as in the air gaps 225, 235 and air path 240) is roughly 100,000 times more rapid than diffusion through permeable solids such as rigid gas permeable ("RGP") plastic. As a result, the oxygen transmissibility of the contact lens 200 is defined primarily by the thicknesses and materials of the two coverings 220, 230, and not by the thickness of the air gaps 225, 235 or the core 210. The oxygen transmissibility "Dk/t" of the entire contact lens 200 may be approximated based upon the Dk/t of the areas of the outer covering 220 and inner covering 230 overlapping the outer air gap 225 and inner air gap 235, respectively, and not on the thickness or material of the core 210. The thickness and material of the core 210 may be selected to accommodate a desired payload and provide sufficient structural strength to support the payload. Here, Dk is oxygen permeability, where D is a diffusion constant measured in $$\left(\frac{cm^2}{sec}\right),$$

and k is a concentration of $O_2$ per unit of $O_2$ partial pressure and is measured in $$\left(\frac{ml_{O_2}}{ml}\right)\left(\frac{1}{mmHg}\right).$$

The t is thickness of the material. Dk/t is often quoted in units of $$10^{-11}\left(\frac{cm^2}{sec}\right)\left(\frac{ml_{O_2}}{ml}\right)\left(\frac{1}{mmHg}\right).$$

Some sources recommend an oxygen transmissibility of Dk/t=24 as the minimum for daily wear contact lenses, and an oxygen transmissibility of Dk/t=87 as the minimum recommended for extended wear lenses in contact with the cornea.

In FIG. 2, the inner covering 230 and inner air gap 235 are large enough to cover substantially all of the cornea. In this way, oxygen can diffuse from the air gap 235 through the inner covering 230 directly to all parts of the cornea. Lateral diffusion through the inner covering 230 or tear layer is generally not required. To accommodate typical corneas, the inner covering 230 and inner air gap 235 each have a circular edge of at least approximately 10-13 mm diameter.

For the outer covering 220 and outer air gap 225, the location is less important than the overall surface area exposed to ambient oxygen. In some designs, the outer structure 220, 225 has a same surface area as the inner structure 230, 235. That is, in FIG. 2, the overlap area between the outer covering 220 and outer air gap 225 is at least equal to the overlap area between the inner covering 230 and inner air gap 235.

The air path 240 in FIG. 2 is a single air shaft through a solid section of the core 210, for example a 1 mm diameter air shaft. Because oxygen diffusion in air is high, the specific shape and location of the air path 240 is secondary in importance, so long as it connects the two air gaps 225, 235. For example, the air path may be implemented as two or more air shafts instead of one air shaft. It may also be located in a periphery of the contact lens, for example outside an 8 mm diameter central zone, so that it does not interfere with light entering the eye.

The coverings 220,230 are each relatively thin in comparison to the core 210 and are made of materials that are permeable to oxygen such as rigid gas permeable ("RGP") plastic. On the other hand, the core 210 is sufficiently thick to accommodate the payloads, such as femtoprojectors and electronic components. The core 210 may also be made from an oxygen permeable material such as RGP, or from an oxygen impermeable material such as poly(methyl methacrylate) ("PMMA"). The approach described above may also be used when the core 210 does not contain a payload, but is so thick that it would have insufficient oxygen transmission. In some embodiments, the outer covering 220, core 210, and inner covering 230 are bonded to each other via an adhesive. Suitable adhesives may include glues such as medical grade optical cement. Example glues that may be appropriate for this application include UV-curable optical adhesives from Henkel Loctite.

One feature of the design shown in FIG. 2 is that the core 210, rather than the inner covering 230, makes contact with the sclera through the base surface 216. This provides additional space in the core to accommodate payloads, compared to designs in which the core does not extend all the way to the sclera. This approach may also provide more payload space located close to the perimeter of the contact lens. For example, a coil may be located closer to the perimeter, resulting in a larger area coil and more efficient power transfer. The core 210 material is also a good structural material to support the payloads.

In this example, the outer covering 220 has an annular shape and does not cover a center area of the contact lens. Because the outer covering 220 does not extend to the center of the core 210, the outer covering 220 does not contribute to the total thickness at the center of the contact lens 200. As a result, the contact lens 200 has a reduced thickness in comparison to a contact lens having an outer covering that also covers the center of the core. In addition, if the center hole of the outer covering 220 is large enough (e.g., 8 mm diameter or larger), it will not interfere with light passing through the contact lens to reach the wearer's eye, eliminating potential optical reflection or scattering that may occur at the boundaries between the outer covering 220, the outer air gap 225, and the core 210. Furthermore, an annular outer covering 220 may be more durable and more easily supported by the core 210 in comparison to one that must be supported over the entire center area of the contact lens. Thus, the outer covering 220 can be made thinner while still maintaining structural integrity, which increases the oxygen transmission through the outer covering.

In addition, both coverings 220, 230 are flush with the core 210. The outer surface 212 of the core has a recess for the outer covering 220, so that the outer covering and the core's adjoining outer surface 212 form a smooth surface. Because the eyelid blinks over the contact lens, a smooth outer surface is more comfortable, as well as providing an overall thinner contact lens as described above. The inner surface 213 of the core also has a recess for the inner covering 230, also resulting in a smooth surface between the two.

FIGS. 3A-3C are a more detailed perspective view, cross-sectional view and exploded view of the scleral contact lens shown in FIG. 2. As shown in FIGS. 3A-3C, the outer covering 220, core 210, and inner covering 230 are overlaid on top of each other to form the contact lens 200, and may be aligned and secured using one or more registration features. These registration features 322 and 332 are marked on the left side of FIG. 3B. The structures may also contain support features such as ridges or protrusions, or spacers such as plastic micro balls, cylindrical or rectangular posts, etc., to prevent the air gaps from collapsing and to maintain the overall structural integrity of the contact lens.

In addition to the structures shown in FIG. 2 for oxygen transmission, FIG. 3 also shows the femtoprojector 114 and electronics 112 (and interconnect between them) and coil 145 from FIG. 1. The core 210 includes features to accommodate these payloads. For example, the core 210 has a through-hole 314 within the central zone of the core to accommodate the femtoprojector 114. The femtoprojector 114 is placed within the through-hole 314 and secured using an encapsulating material, which functions both to fix the position of the femtoprojector and to protect the femtoprojector from the outside environment.

As another example, the core 210 also includes a groove 345 formed around the circumference of the core 210. The power coil 145 is wound inside this groove 345. Note that the groove 345 is not separated from the outer air gap 225, which may allow components to be located close to the perimeter. In some cases, the component (e.g., coils 145) may be encapsulated in an adhesive or other material so that the components are not exposed to the air within the outer air gap 225. Other features are used to accommodate other payloads, such as the electronics 112 or interconnects.

In FIG. 3, the air path is a single air shaft 240. It is formed within the core 210 and traverses the thickness of the core 210 to connect the outer air gap 225 to the inner air gap 235. The air shaft is formed in the peripheral zone of the core 210. It may be oriented to be substantially perpendicular to the outer and inner surfaces of the core 210, and connects laterally overlapping portions of the outer air gap 225 and inner air gap 235.

In some embodiments, the components of the contact lens (the outer covering 220, core 210, and inner covering 230) are manufactured separately and assembled together at a later time. For example, the outer covering 220, core 210, and inner covering 230 may each be a prefabricated component. Different variations of each component may be fabricated to create different possible combinations. In some embodiments, the inner covering 230 may be customized to provide a desired amount of refractive correction (e.g., customized for a specific wearer, or one or a plurality of predetermined refractive correction amounts, etc.). For example, the thickness and inner surface of the inner covering 230 may be adjusted to achieve different amounts of refractive correction. On the other hand, the outer covering 220 and the core 210 may be manufactured as standard components. The outer surface of the inner covering 230 may have a predetermined common shape, allowing for the outer covering 220 and core 210 to be placed on different inner coverings 230 having different amounts of refractive correction. In other embodiments, different variations of the outer covering 220 and core 210 may be manufactured and assembled with the remaining components. In some embodiments, the shapes of the components may be modified by precision machining on a diamond lathe.

Figure 4:
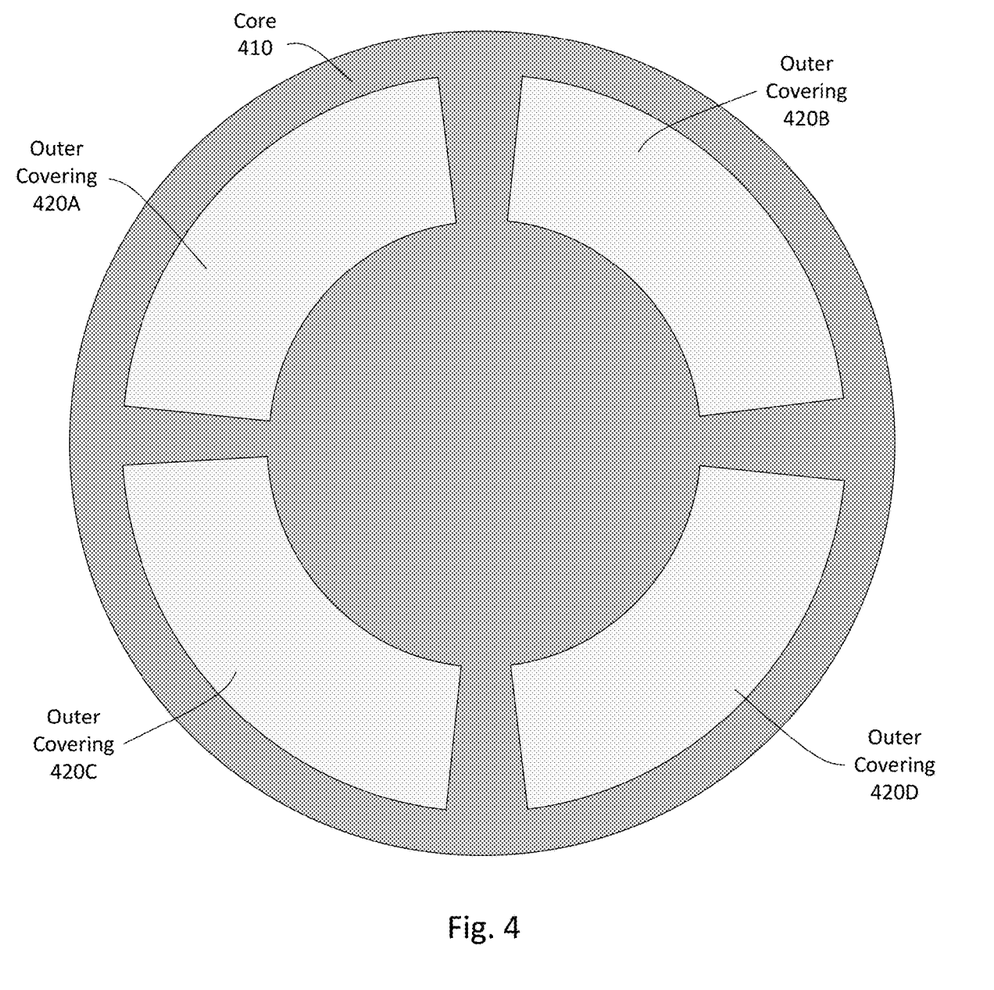
FIG. 4 shows a top down view of a scleral contact lens, in which the outer covering is divided into separate pieces.

FIG. 4 shows a top down view of a contact lens, in which the outer covering is divided into separate pieces. In FIGS. 2 and 3, the outer covering 220 is a single annular piece. In alternate embodiments, the outer covering may have several separate pieces. In FIG. 4, the outer covering 420 is divided into four separate pieces 420A-D. When placed over the core 410, each of the outer covering pieces 420A-D forms a separate outer air gap between it and the core 410, each of which is connected to the inner air gap via an air path. While FIG. 4 shows a space between each of the outer covering pieces 420A-D, in some embodiments, the outer covering pieces 420A-D directly abut each other when placed over the core 410. Using separate pieces can reduce the mechanical stress on each piece.

Figure 5:
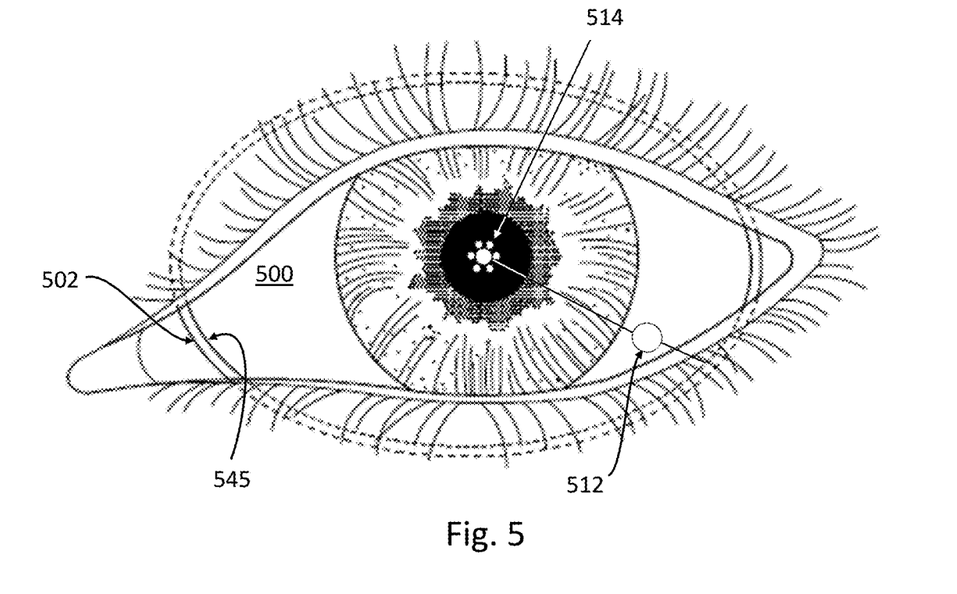
FIG. 5 shows an oval scleral contact lens display mounted on a user's eye.

FIG. 5 shows an oval scleral contact lens display mounted on a user's eye. The contact lens 500 has a non-circular perimeter 502 and extends below the upper and lower eyelids. In this example, the contact lens 500 has an "oval" perimeter 502 that is elongated along the direction of the eye opening. Due to the curvature of the eye, the actual shape of the perimeter is three-dimensional. However, for convenience, it will be referred to as oval. Due to the size of the contact lens 500, it is partially covered by the user's eyelids. FIG. 5 also shows a set of femtoprojectors 514, electronics 512 and coil 545.

One advantage of a non-circular perimeter is that the contact lens is larger and has more space to carry payloads. Another advantage is that the perimeter is larger so that larger coils 545 may be used. For example, the conductive coil 545 may be constructed so that it lies parallel to and within 0.3 mm to 3 mm of the perimeter 502 (e.g., the coil 545 lies within 2 mm of the perimeter 502). Although the contact lens is larger with a non-circular perimeter, the inner covering and inner air gap may have the same circular size and shape as described previously since that is sufficient to oxygenate the cornea.

Figure 6:
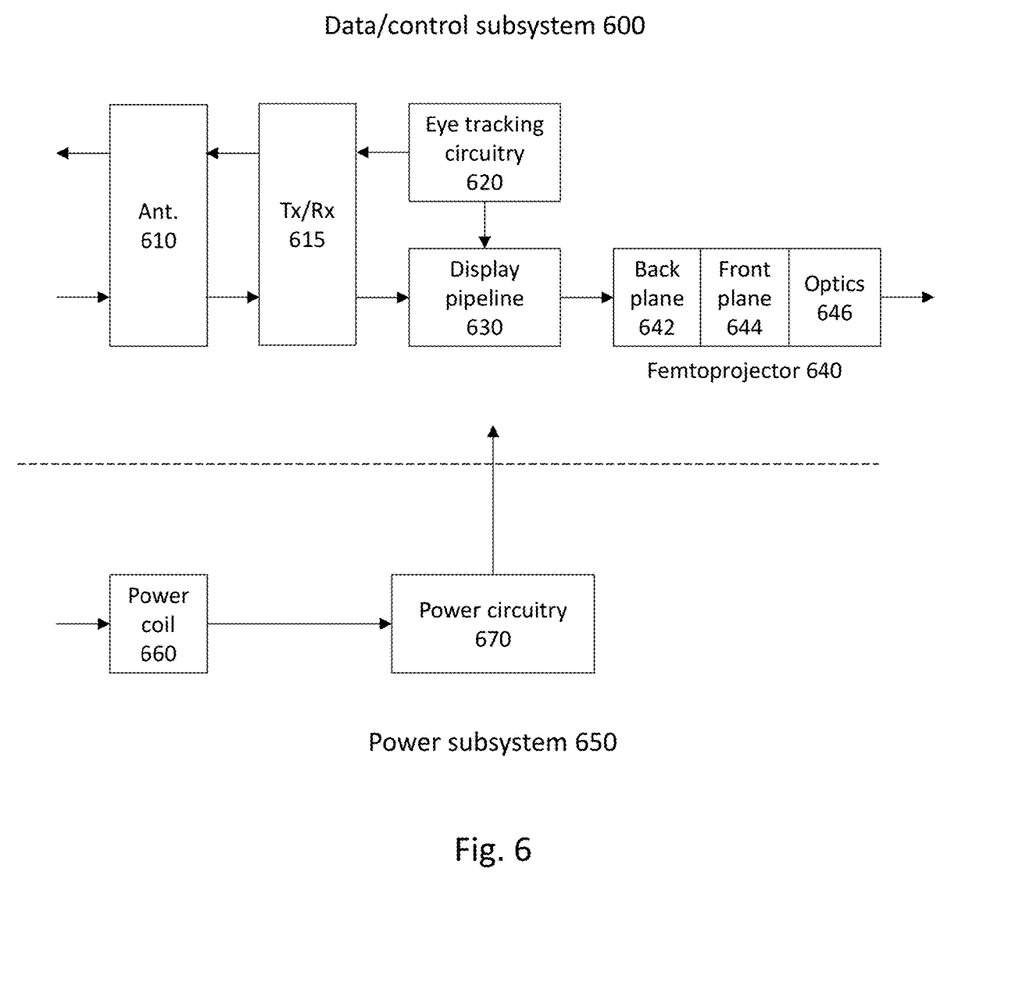
FIG. 6 is a functional block diagram of an eye-mounted display using a scleral contact lens.

FIG. 6 is a functional block diagram of an eye-mounted display using the scleral contact lenses described above. The display can be divided into a data/control subsystem 600 and a power subsystem 650.

In this example, the receive path of the data/control subsystem 600 includes an antenna 610, receiver circuitry 615, a data pipeline 630, and a femtoprojector 640. Data from an external source is wirelessly transmitted to the display via the antenna 610. The receiver circuitry 615 performs the functions for receiving the data, for example demodulation, noise filtering, and amplification. It also converts the received signals to digital form. The pipeline 630 processes the digital signals for the femtoprojector 640. These functions may include decoding, and timing. The processing may also depend on other signals generated internally within the contact lens, for example eye tracking 620 or ambient light sensing. The femtoprojector 640 then projects the corresponding images onto the wearer's retina. In this example, the femtoprojector 640 includes a CMOS ASIC backplane 642, LED frontplane 644 and optics 646, as described previously.

The data/control subsystem 600 may also include a back channel through transmitter circuitry 615 and antenna 610. For example, the contact lens may transmit eye tracking data, control data and/or data about the status of the contact lens.

Power is received wirelessly via a power coil 660. This is coupled to circuitry 670 that conditions and distributes the incoming power (e.g., converting from AC to DC if needed). The power subsystem 650 may also include energy storage devices, such as batteries or capacitors.

In addition to the components shown in FIG. 6, the overall system may also include components that are outside the contact lens (i.e., off-lens). For example, head tracking and eye tracking functions may be performed partly or entirely off-lens. The data pipeline may also be performed partially or entirely off-lens. Each of the arrows on the lefthand side of FIG. 6 also connects to an off-lens component. The power transmitter coil is off-lens, the source of image data and control data for the contact lens display is off-lens, and the receive side of the back channel is off-lens.

There are many ways to implement the different system functions. Some portions of the system may be entirely external to the user, while other portions may be worn by the user in the form of a headpiece or glasses. Components may also be worn on a belt, armband, wrist piece, necklace, or other types of packs. FIG. 1A shows an example where some functionality is implemented in a necklace 160 worn by the user. In this example, the necklace 160 includes a wireless transmitter that communicates with the eye-mounted display 100.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the invention should be determined by the appended claims and their legal equivalents.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A scleral contact lens that mounts to a sclera of an eye, comprising:
    a core having an outer surface that faces outwards away from the eye, an inner surface that faces inwards towards the eye, the inner surface comprising a base surface that attaches to the sclera; the core carrying a payload;

a gas-permeable outer covering over the core's outer surface, the outer covering and the core's outer surface forming an outer air gap therebetween that receives oxygen from the external environment through the gas-permeable outer covering;

a gas-permeable inner covering under the core's inner surface and disposed over a cornea of the eye, the inner covering and the core's inner surface forming an inner air gap therebetween that passes oxygen to the cornea of the eye through the gas-permeable inner covering, the base surface attaching to the sclera outside the inner covering; and wherein the core contains an air path traversing the core from the outer air gap to the inner air gap.

2. The scleral contact lens of claim 1 wherein the outer covering is located entirely outside a 8 mm diameter central zone of the contact lens.

3. The scleral contact lens of claim 2 wherein the outer covering has an annular shape with a center hole of at least 8 mm diameter.

4. The scleral contact lens of claim 1 wherein an overlap area between the outer covering and the outer air gap is at least as large as an overlap area between the inner covering and the inner air gap.

5. The scleral contact lens of claim 1 wherein the core includes a recess for the outer covering, so that the outer covering and the core's adjoining outer surface form a smooth surface for the contact lens.

6. The scleral contact lens of claim 1 wherein the inner covering does not contact the sclera.

7. The scleral contact lens of claim 6 wherein the core includes a recess for the inner covering.

8. The scleral contact lens of claim 1 wherein the inner covering and inner air gap each has a diameter of at least 10 mm.

9. The scleral contact lens of claim 1 wherein the outer covering is glued to the core, and the inner covering is also glued to the core.

10. The scleral contact lens of claim 1 wherein the air path consists of one or two air shafts.

11. The scleral contact lens of claim 1 wherein the air path comprises one or more air shafts that are all outside a 8 mm diameter central zone of the contact lens.

12. The scleral contact lens of claim 1 wherein the core comprises a gas-impermeable shell that contains a payload of one or more electrical components.

13. The scleral contact lens of claim 12 wherein the air path comprises one or more air shafts through a solid section of the gas-impermeable shell.

14. The scleral contact lens of claim 12 wherein the gas-impermeable shell comprises PMMA.

15. The scleral contact lens of claim 1 wherein the payload comprises a femtoprojector that projects images onto a retina of the eye.

16. The scleral contact lens of claim 15 wherein the payload further comprises an antenna for data communication to outside the contact lens, driver circuitry for the femtoprojector, a power source, and electrical interconnects that connect the electrical components.

17. The scleral contact lens of claim 15 wherein the payload further comprises an accelerometer, gyroscope or magnetometer.

18. The scleral contact lens of claim 1 wherein the payload comprises a power coil that does not laterally overlap with the outer covering.

19. The scleral contact lens of claim 1 wherein the contact lens has a non-circular perimeter.

20. The scleral contact lens of claim 1 wherein:
the outer covering has an annular shape with a center hole of at least 8 mm diameter, and the core includes a recess for the outer covering so that the outer covering and the core's adjoining outer surface form a smooth surface for the contact lens;
the core includes a recess for the inner covering, and the inner covering does not contact the sclera;
the air path comprises one or more air shafts that are all outside a 8 mm diameter central zone of the contact lens; and
the payload comprises a femtoprojector that projects images onto a retina of the eye.

21. The scleral contact lens of claim 1 wherein the payload comprises one or more electrical components.

* * * * *